(12) United States Patent
Phelan et al.

(10) Patent No.: US 9,248,614 B2
(45) Date of Patent: Feb. 2, 2016

(54) METHOD FOR LATHING SILICONE HYDROGEL LENSES

(75) Inventors: John Christopher Phelan, Gurnee, IL (US); Michael Hugh Quinn, Valparaiso, IN (US); Rafael Victor Andino, Lawrenceville, GA (US); Marcia Kay Ash, Snellville, GA (US); Allen Douglas Gilliard, Buford, GA (US); Tomasz Jankiewicz, Flowery Branch, GA (US); Courtney Flem Morgan, Alpharetta, GA (US); Joseph Michael Lindacher, Suwanee, GA (US); Corneliu Daniel Niculas, Suwanee, GA (US)

(73) Assignee: Novartis AG, Basel (CH)

( * ) Notice: Subject to any disclaimer, the term of this patent is extended or adjusted under 35 U.S.C. 154(b) by 1834 days.

(21) Appl. No.: 11/147,594

(22) Filed: Jun. 8, 2005

(65) Prior Publication Data

US 2006/0001184 A1    Jan. 5, 2006

Related U.S. Application Data

(60) Provisional application No. 60/584,047, filed on Jun. 30, 2004.

(51) Int. Cl.
  *B29D 11/00* (2006.01)
  *B29C 47/00* (2006.01)
  *B29C 69/00* (2006.01)

(52) U.S. Cl.
  CPC .... *B29D 11/00038* (2013.01); *B29D 11/00076* (2013.01); *B29D 11/00932* (2013.01); *B29C 47/0021* (2013.01); *B29C 47/0038* (2013.01); *B29C 47/0057* (2013.01); *B29C 69/001* (2013.01)

(58) Field of Classification Search
  USPC .......................... 264/1.38, 1.32, 2.7, 157, 236
  See application file for complete search history.

(56) References Cited

U.S. PATENT DOCUMENTS

| | | | |
|---|---|---|---|
| 4,139,513 A | 2/1979 | Tanaka et al. | 260/29.6 |
| 4,153,641 A * | 5/1979 | Deichert et al. | 526/264 |
| 4,661,573 A * | 4/1987 | Ratkowski et al. | 526/245 |
| 4,711,943 A | 12/1987 | Harvey, III | 526/279 |
| 4,954,586 A | 9/1990 | Toyoshima | |
| 5,089,180 A * | 2/1992 | Dunks et al. | 264/1.7 |
| 5,244,981 A | 9/1993 | Seidner | |
| 5,260,000 A | 11/1993 | Nandu et al. | 264/2.1 |
| 5,264,878 A * | 11/1993 | Gruber et al. | 351/160 R |
| 5,310,779 A * | 5/1994 | Lai | 524/588 |
| 5,314,960 A * | 5/1994 | Spinelli et al. | 525/280 |
| 5,314,961 A * | 5/1994 | Anton et al. | 525/280 |
| 5,321,108 A * | 6/1994 | Kunzler et al. | 526/242 |
| 5,331,067 A * | 7/1994 | Seidner et al. | 525/479 |
| 5,331,073 A * | 7/1994 | Weinschenk et al. | 526/264 |
| 5,406,341 A * | 4/1995 | Blum et al. | 351/160 R |
| 5,505,884 A * | 4/1996 | Burke et al. | 264/1.1 |
| 5,656,210 A | 8/1997 | Hill | |
| 5,760,100 A | 6/1998 | Nicolson et al. | 523/106 |
| 5,776,999 A | 7/1998 | Nicolson et al. | 523/106 |
| 5,789,461 A | 8/1998 | Nicolson et al. | 523/106 |
| 5,846,457 A | 12/1998 | Hoffman | |
| 5,849,811 A | 12/1998 | Nicolson et al. | 523/106 |
| 5,908,906 A * | 6/1999 | Kunzler et al. | 526/279 |
| 5,945,498 A | 8/1999 | Hopken et al. | 528/42 |
| 5,965,631 A | 10/1999 | Nicolson et al. | 523/106 |
| 6,043,328 A * | 3/2000 | Domschke et al. | 526/279 |
| 6,199,982 B1 * | 3/2001 | Oyama et al. | 351/161 |
| 6,284,159 B1 * | 9/2001 | Lossman et al. | 264/1.1 |
| 6,315,650 B1 | 11/2001 | Council, Jr. et al. | 451/384 |
| 6,325,509 B1 * | 12/2001 | Hodur et al. | 351/160 R |
| 6,638,991 B2 | 10/2003 | Baba | |
| 6,649,722 B2 | 11/2003 | Rosenzweig et al. | 526/279 |
| 6,659,607 B2 * | 12/2003 | Miyamura et al. | 351/160 R |
| 6,815,074 B2 * | 11/2004 | Aguado et al. | 428/447 |
| 6,871,953 B1 | 3/2005 | Mandell et al. | 351/161 |
| 6,874,888 B1 | 4/2005 | Dudai | 351/162 |
| 7,022,749 B2 * | 4/2006 | Salamone et al. | 523/107 |
| 7,037,954 B2 | 5/2006 | Baba | |
| 7,052,133 B2 | 5/2006 | Lindacher | |
| 7,163,292 B2 * | 1/2007 | Dahi et al. | 351/177 |
| 2002/0075446 A1 * | 6/2002 | Lossman et al. | 351/159 |
| 2002/0107337 A1 * | 8/2002 | Rosenzweig et al. | 525/474 |
| 2002/0198280 A1 | 12/2002 | Baba | |
| 2003/0105255 A1 | 6/2003 | Salamone et al. | 526/303.1 |
| 2004/0002556 A1 * | 1/2004 | Molock et al. | 522/6 |
| 2004/0039077 A1 | 2/2004 | Baba | |
| 2004/0054026 A1 | 3/2004 | Kunzler et al. | 523/106 |
| 2004/0179167 A1 | 9/2004 | Dahi et al. | 351/160 |
| 2004/0233382 A1 | 11/2004 | Lindacher | |
| 2005/0027031 A1 | 2/2005 | Chang et al. | 522/68 |
| 2005/0031669 A1 | 2/2005 | Shafiee et al. | 424/426 |
| 2005/0033210 A1 | 2/2005 | Shahinpoor | 602/41 |
| 2005/0038219 A1 | 2/2005 | Lai et al. | 528/32 |
| 2005/0041299 A1 | 2/2005 | Gallas | 359/642 |
| 2005/0054802 A1 | 3/2005 | Lai et al. | 528/1.5 |

(Continued)

FOREIGN PATENT DOCUMENTS

| | | |
|---|---|---|
| EP | 0 379 146 | 5/1995 |
| EP | 1 197 782 | 6/2004 |

(Continued)

OTHER PUBLICATIONS

Standard European Search Report.

(Continued)

*Primary Examiner* — Yogendra Gupta
*Assistant Examiner* — Kimberly A Stewart
(74) *Attorney, Agent, or Firm* — Sheng-Hsin Hu; Jian Zhou

(57) ABSTRACT

The present invention provides methods for lathing at room temperature a silicone hydrogel material, in particular silicone hydrogel material having a high oxygen permeability and made of a polymerizable composition containing a relative large amount of oxyperm component, into contact lenses.

7 Claims, No Drawings

(56) References Cited

U.S. PATENT DOCUMENTS

| | | |
|---|---|---|
| 2005/0055091 A1 | 3/2005 | Lai et al. ........................ 623/5.16 |
| 2005/0062933 A1 | 3/2005 | Perel et al. ..................... 351/161 |
| 2005/0070661 A1* | 3/2005 | Molock .......................... 524/556 |
| 2005/0154080 A1 | 7/2005 | McCabe et al. ............... 523/107 |

FOREIGN PATENT DOCUMENTS

| | | |
|---|---|---|
| JP | 62-103029 | 5/1987 |
| JP | 62278024 A | 12/1987 |
| JP | 2001201723 A | 7/2001 |
| WO | 84/00763 A1 | 3/1984 |
| WO | WO 93/05085 | 3/1993 |
| WO | WO 2005/026216 | 3/2005 |
| WO | WO 2005/031442 | 4/2005 |

OTHER PUBLICATIONS

International Search Report—PCT Written Opinion.
Query Structures.
PDMS & Acrylamide & Contact Lenses.
PDMS & IEM & Contact Lenses I.
PDMS & IEM & Contact Lenses II.
PDMS & IEM & Contact Lenses III.
Search VI.
Search VII.
English Translation of Japan Office Action Notification of Reasons for Rejection, Dispatch No: 177032, Dispatch Date: Mar. 15, 2011, Japanese Patent Application No. 2007-518530.
English Translation of Japan Office Action Notification of Reasons for Rejection, Dispatch No. 606417, Dispatch Date: Sep. 6, 2011, Japanese Patent Application No. 2007-518530.

* cited by examiner

METHOD FOR LATHING SILICONE HYDROGEL LENSES

This application claims the benefit under 35 USC §119(e) of U.S. provisional application No. 60/584,047 filed Jun. 30, 2004, incorporated by reference in its entirety.

The present invention is related to methods for making silicone hydrogel lenses, in particular to lathing silicone hydrogel lenses at room temperature.

BACKGROUND OF THE INVENTION

Contact lenses are widely used for correcting many different types of vision deficiencies. These include low-order monochromatic aberrations such as defocus (near-sightedness or myopia and far-sightedness or hypermetropia), astigmatism, prism, and defects in near range vision usually associated with aging (presbyopia). Contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. "Soft" contact lenses conform closely to the shape of the eye, so oxygen cannot easily circumvent the lens. Thus, soft contact lenses must allow oxygen to diffuse through the lens to reach the cornea, namely having a relatively high oxygen transmissibility (i.e., oxygen permeability over the lens thickness) from the outer surface to the inner surface to allow sufficient oxygen permeate through the lens to the cornea and to have minimal adverse effects on corneal health. High oxygen permeable silicone hydrogel materials have been developed to fulfill such requirements for making contact lenses capable of providing corneal health benefits, such as, for example, Focus NIGHT & DAY™ (CIBA VISION).

Silicone Hydrogels are typically formed of a copolymer of a polymerizable mixture including at least one hydrophilic monomer and a silicone-containing monomer or macromer. In general, silicone hydrogel contact lenses are mass-produced by a full molding process involving disposable molds. Partly because of the relatively-high cost associated with use of molds and partly because of difficulty in managing an inventory with a huge number of SKUs, a family of silicone hydrogel contact lenses made by a lens molding process generally can only have a limited number of variations in optical power and/or choices of base curve and/or the like. In most cases, a patient has to use contact lenses which would have closes match to his (her) prescription. Made-to-order or customized contact lenses can be made, e.g., by directly lathing, to match to a patient's prescription. However, it is generally believed in the art that a silicone hydrogel material can only be lathed at low temperature because of its softness and/or stickiness. Manufacturing cost could be high due to the high cost associated with low temperature lathing. Therefore, it would be desirable for a manufacturer to lathe silicone hydrogel contact lenses at room temperature.

Moreover, although silicone hydrogel contact lenses can be mass-produced economically by a full-molding process involving disposable molds, a full-molding process using disposable molds may not be suitable for making a contact lens having a relatively complex surface design because of its relatively low fidelity in reproducing all features of a lens design due to unavoidable fluctuations in the dimensions of disposable molds. Examples of contact lenses with relatively complex surface designs include without limitation contact lenses for correcting astigmatism, prism, presbyopia and customized lenses for correcting high-order monochromatic aberrations (e.g., such as a non-standard amount of spherical aberration, coma, and other irregular high-order aberrations). Those contact lenses for correcting astigmatism, prism, presbyopia and high-order monochromatic aberrations must require at least some special features built in a contact lens to provide a rotational and/or orientational stability on an eye. Their effectiveness and performance may largely depend upon both the design of orientation/stabilization features and the accurate duplication of the designs of those features. However, it is expected that, during injection-molding of molds, fluctuations in the dimensions of molds can occur as results of fluctuations in the production process (temperatures, pressures, material properties) and/or of non-uniformly shrink after the injection molding.

Therefore, there is a need for a method of lathing silicone hydrogel contact lenses at room temperature (or ambient temperature).

SUMMARY OF THE INVENTION

The present invention, in one aspect, provides a method of making silicone-hydrogel contact lenses by directly lathing a silicone hydrogel material at room temperature. The method of the invention comprises: obtaining a lens-forming fluid material capable of forming a polymer or copolymer having high oxygen permeability, wherein the lens-forming material includes at least one silicone-containing vinylic monomer or macromer and at least one hydrophilic vinylic monomer; filling one or more tubes with the lens-forming material; slowly curing the lens-forming material in the tubes to form a polymer in a form of rod and having the high oxygen permeability; stripping away the tubes from the polymer; post-curing and/or drying the polymer for a time sufficiently long to increase the lathability at room temperature of the polymer; and lathing at room temperature the polymer to produce the contact lenses having an oxygen transmissibility of at least 45 barrers/mm and an ion permeability characterized either by an Ionoton Ion Permeability Coefficient of greater than about $0.2 \times 10^{-6}$ cm$^2$/sec or by an Ionflux Diffusion Coefficient of greater than about $1.5 \times 10^{-6}$ cm$^2$/min.

The present invention, in another aspect, provides a method of making silicone-hydrogel contact lenses by directly lathing a silicone hydrogel material at room temperature. The method of the invention comprises: providing a mold for cast-molding of a polymer button; filling the mold with a lens-forming fluid material capable of forming a polymer or copolymer having high oxygen permeability, wherein the lens-forming material includes at least one silicone-containing vinylic monomer or macromer and at least one hydrophilic vinylic monomer; curing the lens-forming material in the mold to form a polymer in a form of button and having the high oxygen permeability; removing the button from the mold; post-curing and/or drying the button for a time sufficient long to increase the lathability at room temperature of the button; and lathing at room temperature the button into a silicone hydrogel contact lens having an oxygen transmissibility of at least 45 barrers/mm and an ion permeability characterized either by an Ionoton Ion Permeability Coefficient of greater than about $0.2 \times 10^{-6}$ cm$^2$/sec or by an Ionoflux Diffusion Coefficient of greater than about $1.5 \times 10^{-6}$ cm$^2$/min.

The present invention, in a further aspect, provides a method of making silicone-hydrogel contact lenses, the method comprising: providing a mold for cast-molding of bonnets, wherein the mold includes a mold half having a molding surface with optical quality, wherein the molding surface defines one of the posterior and anterior surface of a silicone hydrogel contact lens; filling the mold with a lens-forming fluid material capable of forming a polymer or copolymer having high oxygen permeability, wherein the lens-forming material includes at least one silicone-containing vinylic monomer or macromer and at least one hydrophilic vinylic monomer; curing the lens-forming material in the mold to form a polymer in a form of bonnet and having the high oxygen permeability, wherein the bonnet has an optically finished surface corresponding to one of the anterior and posterior surfaces of the contact lens; removing the bonnet from the mold; post-curing and/or drying the bonnet for a time sufficient long to increase the lathability at room temperature of the bonnet; and forming the anterior surface by directly lathing at room temperature of the bonnet on the side opposite to the optically finished surface, thereby obtaining the contact lens, wherein the obtained contact lens has an oxygen transmissibility of at least 45 barrers/mm and an ion permeability characterized either by an Ionoton Ion Permeability Coefficient of greater than about $0.2 \times 10^{-6}$ cm$^2$/sec or by an Ionoflux Diffusion Coefficient of greater than about $1.5 \times 10^{-6}$ cm$^2$/min.

The present invention, in still a further aspect, provides a method of making a contact lens, the contact lens having an anterior surface and an opposite posterior surface, the anterior surface having a central optical zone and one or more substantially annular non-optical zones surrounding the central optical zone, the method comprising: providing a mold for cast-molding of bonnets, wherein the mold includes a first mold half having a first molding surface with optical quality and a second mold half having a second molding surface, wherein the second molding surface has a substantially-annular peripheral molding zone with optical quality, wherein the first molding surface defines the posterior surface of the contact lens, wherein the peripheral molding zone defines the one or more non-optical zones on the anterior surface of the contact lens; filling the mold with a lens-forming fluid material; curing the lens-forming fluid material in the mold to form a polymer in a form of bonnet, wherein the bonnet has one optically finished surface corresponding to the posterior surface of the contact lens and one surface having an optically finished zone corresponding to the one or more substantially annular non-optical zones surrounding the central optical zone of the contact lens; removing the bonnet from the mold; post-curing and/or drying the bonnet for a time sufficient long to increase the lathability at room temperature of the bonnet; and forming the central optical zone and optionally a peripheral blending zone bridging the central optical zone and the non-optical zones by directly lathing at room temperature of surface areas, surrounded by the optically-finished zone on the side opposite to the optically-finished surface, of the bonnet, thereby obtaining the contact lens.

DETAILED DESCRIPTION OF EMBODIMENTS OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as common within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. Typically, a contact lens has an anterior surface and an opposite posterior surface and a circumferential edge where the anterior and posterior surfaces are tapered off.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

Each of the anterior and posterior surfaces of a contact lens can comprises a central optical zone and one or more non-optical zones (or peripheral zones) surrounding the central optical zone. Exemplary non-optical zones (or peripheral zones) include without limitation bevel, lenticular, peripheral blending zone and the like.

A "bevel" refers to a non-optical surface zone located at the boundary of the posterior surface of a contact lens. Generally, the bevel is a significantly flatter curve and is usually blended with the base curve (optical posterior surface) of a contact lens and appears as an upward taper near the boundary. This keeps the steeper base curve radius from gripping the eye and allows the boundary to lift slightly. This boundary lift is important for the proper flow of tears across the cornea and makes the lens fit more comfortable.

"A lenticular" refers to a non-optical surface zone of the anterior surface of a contact lens between the optical zone and the boundary. The primary function of the lenticular is to control the thickness of the lens boundary.

A "peripheral blending zone" refers to a non-optical zone located between a lenticular zone and the central optical zone. The presence of a peripheral blending zone can allow to separately and independently design the central optical zone and the peripheral zone, so as to ensure a continuous transition from the central optical zone to the peripheral zone.

"Ocular environment", as used herein, refers to ocular fluids (e.g., tear fluid) and ocular tissue (e.g., the cornea) which may come into intimate contact with a contact lens used for vision correction, drug delivery, wound healing, eye color modification, or other ophthalmic applications.

A "hydrogel" refers to a polymeric material which can absorb at least 10 percent by weight of water when it is fully hydrated. Generally, a hydrogel material is obtained by polymerization or copolymerization of at least one hydrophilic monomer in the presence of or in the absence of additional monomers and/or macromers.

A "silicone hydrogel" refers to a hydrogel obtained by copolymerization of a polymerizable composition comprising at least one silicone-containing vinylic monomer or at least one silicone-containing macromer.

"Hydrophilic," as used herein, describes a material or portion thereof that will more readily associate with water than with lipids.

A "lens-forming material" refers to a polymerizable composition (or formulation) which can be cured (i.e., polymerized and/or crosslinked) thermally or actinically to obtain a crosslinked polymer. As used herein, "actinically" in reference to curing or polymerizing of a polymerizable composition or material or a lens-forming material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art. Lens-forming materials are well known to a person skilled in the art.

A "prepolymer" refers to a starting polymer which can be cured (e.g., crosslinked and/or polymerized) actinically or thermally or chemically to obtain a crosslinked and/or polymerized polymer having a molecular weight much higher than the starting polymer. A "crosslinkable prepolymer" refers to a starting polymer which can be crosslinked upon actinic radiation to obtain a crosslinked polymer having a molecular weight much higher than the starting polymer.

A "monomer" means a low molecular weight compound that can be polymerized. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" is employed herein in a broad sense and is intended to encompass any groups containing at least one $>C=C<$ group. Exemplary ethylenically unsaturated groups include without limitation acryloyl, methacryloyl, allyl, vinyl, styrenyl, or other $C=C$ containing groups.

A "hydrophilic vinylic monomer", as used herein, refers to a vinylic monomer which is capable of forming a homopolymer that is water-soluble or can absorb at least 10 percent by weight water.

A "hydrophobic vinylic monomer", as used herein, refers to a vinylic monomer which is capable of forming a homopolymer that is insoluble in water and can absorb less than 10 percent by weight water.

A "macromer" refers to a medium to high molecular weight compound or polymer that contains functional groups capable of undergoing further polymerizing/crosslinking reactions. Medium and high molecular weight typically means average molecular weights greater than 700 Daltons. Preferably, a macromer contains ethylenically unsaturated groups and can be polymerized actinically or thermally.

"Molecular weight" of a polymeric material (including monomeric or macromeric materials), as used herein, refers to the number-average molecular weight unless otherwise specifically noted or unless testing conditions indicate otherwise.

A "polymer" means a material formed by polymerizing/crosslinking one or more monomers, macromers and or oligomers.

A "photoinitiator" refers to a chemical that initiates radical crosslinking and/or polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is azobisisobutyronitrile (AIBN).

"Visibility tinting" in reference to a lens means dying (or coloring) of a lens to enable the user to easily locate a lens in a clear solution within a lens storage, disinfecting or cleaning container. It is well known in the art that a dye and/or a pigment can be used in visibility tinting a lens.

"Dye" means a substance that is soluble in a solvent and that is used to impart color. Dyes are typically translucent and absorb but do not scatter light. Any suitable biocompatible dye can be used in the present invention.

A "Pigment" means a powdered substance that is suspended in a liquid in which it is insoluble. A pigment can be a fluorescent pigment, phosphorescent pigment, pearlescent pigment, or conventional pigment. While any suitable pigment may be employed, it is presently preferred that the pigment be heat resistant, non-toxic and insoluble in aqueous solutions.

The term "fluid" as used herein indicates that a material is capable of flowing like a liquid.

"Surface modification", as used herein, means that an article has been treated in a surface treatment process (or a surface modification process), in which, by means of contact with a vapor or liquid, and/or by means of application of an energy source (1) a coating is applied to the surface of an article, (2) chemical species are adsorbed onto the surface of an article, (3) the chemical nature (e.g., electrostatic charge) of chemical groups on the surface of an article are altered, or (4) the surface properties of an article are otherwise modified. Exemplary surface treatment processes include, but are not limited to, a surface treatment by energy (e.g., a plasma, a static electrical charge, irradiation, or other energy source), chemical treatments, the grafting of hydrophilic monomers or macromers onto the surface of an article, and layer-by-layer (LbL) deposition of polyelectrolytes. A preferred class of surface treatment processes are plasma processes, in which an ionized gas is applied to the surface of an article, and LbL coating processes.

Plasma gases and processing conditions are described more fully in U.S. Pat. Nos. 4,312,575 and 4,632,844 and published U.S. patent application No. 2002/0025389, which are incorporated herein by reference. The plasma gas is preferably a mixture of lower alkanes and nitrogen, oxygen or an inert gas.

"LbL coating", as used herein, refers to a coating that is not covalently attached to an article, preferably a medical device, and is obtained through a layer-by-layer ("LbL") deposition of polyionic (or charged) and/or non-charged materials on an article. An LbL coating can be composed of one or more layers, preferably one or more bilayers.

The term "bilayer" is employed herein in a broad sense and is intended to encompass: a coating structure formed on a medical device by alternatively applying, in no particular order, one layer of a first polyionic material (or charged material) and subsequently one layer of a second polyionic material (or charged material) having charges opposite of the charges of the first polyionic material (or the charged material); or a coating structure formed on a medical device by alternatively applying, in no particular order, one layer of a first charged polymeric material and one layer of a non-charged polymeric material or a second charged polymeric material. It should be understood that the layers of the first and second coating materials (described above) may be intertwined with each other in the bilayer.

Formation of an LbL coating on an ophthalmic device may be accomplished in a number of ways, for example, as described in U.S. Pat. No. 6,451,871 (herein incorporated by reference in its entirety) and pending U.S. patent applications (application Ser. Nos. 09/774,942, 09/775,104, 10/654,566), herein incorporated by reference in their entireties. One coating process embodiment involves solely dip-coating and dip-rinsing steps. Another coating process embodiment involves solely spray-coating and spray-rinsing steps. However, a number of alternatives involve various combinations of spray- and dip-coating and rinsing steps may be designed by a person having ordinary skill in the art.

An "antimicrobial agent", as used herein, refers to a chemical that is capable of decreasing or eliminating or inhibiting the growth of microorganisms such as that term is known in the art.

"Antimicrobial metals" are metals whose ions have an antimicrobial effect and which are biocompatible. Preferred antimicrobial metals include Ag, Au, Pt, Pd, Ir, Sn, Cu, Sb, Bi and Zn, with Ag being most preferred.

"Antimicrobial metal-containing nanoparticles" refer to particles having a size of less than 1 micrometer and containing at least one antimicrobial metal present in one or more of its oxidation states.

"Antimicrobial metal nanoparticles" refer to particles which is made essentially of an antimicrobial metal and have a size of less than 1 micrometer. The antimicrobial metal in the antimicrobial metal nanoparticles can be present in one or more of its oxidation states. For example, silver-containing nanoparticles can contain silver in one or more of its oxidation states, such as $Ag^0$, $Ag^{1+}$, and $Ag^{2+}$.

"Stabilized antimicrobial metal nanoparticles" refer to antimicrobial metal nanoparticles which are stabilized by a stabilizer during their preparation. Stabilized antimicrobial metal nano-particles can be either positively charged or negatively charged or neutral, largely depending on a material (or so-called stabilizer) which is present in a solution for preparing the nano-particles and can stabilize the resultant nano-particles. A stabilizer can be any known suitable material. Exemplary stabilizers include, without limitation, positively charged polyionic materials, negatively charged polyionic materials, polymers, surfactants, salicylic acid, alcohols and the like.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$[(cm^3\ oxygen)/(cm^2)(sec)(mm^2Hg)] \times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

$$[(cm^3\ oxygen)(mm)/(cm^2)(sec)(mm^2Hg)] \times 10^{-10}$$

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 microns (0.090 mm) would have a Dk/t of 100 barrers/mm (oxygen transmissibility barrers/mm).

The "ion permeability" through a lens correlates with both the Ionoflux Diffusion Coefficient and the Ionoton Ion Permeability Coefficient.

The Ionoflux Diffusion Coefficient, D, is determined by applying Fick's law as follows:

$$D = -n'/(A \times dc/dx)$$

where n'=rate of ion transport [mol/min]
A=area of lens exposed [$mm^2$]
D=Ionoflux Diffusion Coefficient [$mm^2/min$]
dc=concentration difference [mol/L]
dx=thickness of lens [mm]

The Ionoton Ion Permeability Coefficient, P, is then determined in accordance with the following equation:

$$\ln(1-2C(t)/C(0)) = -2APt/Vd$$

where: C(t)=concentration of sodium ions at time t in the receiving cell
C(0)=initial concentration of sodium ions in donor cell
A=membrane area, i.e., lens area exposed to cells
V=volume of cell compartment (3.0 ml)
d=average lens thickness in the area exposed
P=permeability coefficient An Ionoflux Diffusion Coefficient, D, of greater than about $1.5 \times 10^{-6}$ $mm^2/min$ is preferred, while greater than about $2.6 \times 10^{-6}$ $mm^2/min$ is more preferred and greater than about $6.4 \times 10^{-6}$ $mm^2/min$ is most preferred.

An Ionoton Ion permeability Coefficient, P, of greater than about $0.2 \times 10^{-6}$ $cm^2$/second is preferred, while greater than about $0.3 \times 10^{-6}$ $cm^2$/second is more preferred and greater than about $0.4 \times 10^{-6}$ $cm^2$/second is most preferred.

It is known that on-eye movement of the lens is required to ensure good tear exchange, and ultimately, to ensure good corneal health. Ion permeability is one of the predictors of on-eye movement, because the permeability of ions is believed to be directly proportional to the permeability of water.

It has been theorized by Nicolson et al. (U.S. Pat. No. 5,760,100), herein incorporated by reference in its entirety, that water permeability is an exceptionally important feature for an extended-wear lens which includes oxyperm polymers such as those disclosed herein. Siloxane-containing materials having high oxygen permeability and low water permeability tend to adhere strongly to the eye, thereby stopping on-eye movement. The ability to pass water through the lens is believed to allow a siloxane-containing polymeric lens to move on the eye, where the movement occurs via forces exerted by water being squeezed out of the lens. The water permeability of the lens is also believed important in replenishing lens water content once pressure is removed.

Nicolson et al. (U.S. Pat. No. 5,760,100) also found that above a certain threshold of ion permeability through a lens, from the inner surface of the lens to the outer, or vice versa, the lens will move on the eye, and below the threshold the lens will adhere to the eye. The ion permeability through a lens correlates with both the Ionoflux Diffusion Coefficient and the Ionoton Ion Permeability Coefficient.

The water permeability of a lens may be determined by the Hydrodell Technique described by Nicolson et al. in U.S. Pat. No. 5,849,811. This technique may be used to determine the likelihood of adequate on-eye movement.

The term "oxyperm component in a polymerizable composition" as used herein, refers to monomers, oligomers, macromers, and the like, and mixtures thereof, which are capable of polymerizing with like or unlike polymerizable materials to form a polymer which displays a relatively high rate of oxygen diffusion therethrough.

Room temperature (or ambient temperature) is defined as 22±6° C.

The term "lathability" in reference to a material is referred to its capability to be machined into a contact lens with optical quality using typical lens lathing equipments. One gauge of lathability of a material is its glass transition temperature ($T_g$). Single phase polymeric materials with $T_g$ below room temperature (i.e., lathing temperature) are considered to be too soft for room temperature lathing whereas those with $T_g$ above room temperature (i.e., lathing temperature), preferably at least 3 degrees above room temperature (i.e., lathing temperature), have sufficient hardness for lathing at room temperature (i.e., lathing temperature). Microscopically multiphasic polymeric materials may display one apparent single $T_g$ or more than one $T_g$. As long as a microscopically multiphasic polymeric material has a $T_g$ associated with the dominant phase of the material being above room temperature, it can be lathed into contact lenses at room temperature. "Dominant phase" is defined herein as a phase in a multiphasic material that determines the overall (bulk or working) hardness of a material.

The term "rod" refers to a cylinder cast-molded from a lens-forming material in a tube, wherein the cylinder has a length of about 1 cm or longer.

The term "button" refers to a short cylinder (with length of about 1 cm or less) cast-molded from a lens-forming material in a mold. In accordance with the present invention, both the opposite surfaces of a button can flat and curved. For example, one of the two opposite surfaces of a button can be a concave curved (e.g., hemispherical) surface whereas the other surface is a convex curved (e.g., hemispherical) surface).

The term "bonnet" refers to a polymeric button obtained by cast-molding or spin-casting from a lens-forming material in a mold, wherein at least one of the two opposite surfaces of the bonnet has an optically finished surface corresponding to one of the anterior and posterior surfaces of a contact lens. The term "optically finished" in reference to a surface or a zone in a surface refers to a surface of a contact lens or a zone in a surface of a contact lens, wherein the surface or zone does not need to undergo further processing, e.g., such as, polishing or lathing. One could also machine lenses from pseudo bonnets. A pseudo bonnet is a part that would require lathing of both sides of the material in order to obtain a contact lens. This type of part would allow for flexibility in the design of the front an back surfaces of a lens while minimizing material losses.

The present invention is generally directed to methods for lathing at room temperature a silicone hydrogel material into contact lenses. The present invention demonstrates that it is possible to lathe at room temperature a silicone hydrogel, including those silicone hydrogel having a high oxygen permeability (40 Barrers or higher when testing a sample with a thickness of 100 microns for apparent (directly measured) oxygen permeability according to procedures described in Examples) and made of a polymerizable composition containing a relative large amount of oxyperm component, can be lathed with any lathing instruments at room temperature. It was a common belief that a silicone hydrogel material, especially a silicone hydrogel material having a high oxygen permeability, is too soft and sticky for lathing at room temperature and as such, it has to be lathed at low temperature (lower than room temperature).

The invention, in one aspect, provides a method for making silicone-hydrogel contact lenses. The method of the invention comprises: obtaining a lens-forming fluid material capable of forming a polymer or copolymer having high oxygen permeability, wherein the lens-forming material includes at least one silicone-containing vinylic monomer or macromer and at least one hydrophilic vinylic monomer; filling one or more tubes with the lens-forming material; slowly curing the lens-forming material in the tubes to form a polymer in a form of rod and having the high oxygen permeability; stripping away the tubes from the polymer; post-curing and/or drying the polymer for a time sufficient long to increase the lathability at room temperature of the polymer; and lathing at room temperature the polymer into the contact lenses having an oxygen transmissibility of at least 45, preferably at least 60, more preferably 70 barrers/mm and an ion permeability characterized either by an Ionoton Ion Permeability Coefficient of greater than about $0.2 \times 10^{-6}$ cm$^2$/sec or by an Ionoflux Diffusion Coefficient of greater than about $1.5 \times 10^{-6}$ cm$^2$/min.

In accordance with the present invention, a lens-forming fluid material can be a solution or a solvent-free liquid or melt at a temperature below 60° C.

In accordance with the present invention, a polymerizable fluid material can be any formulations for making soft contact lenses. Exemplary formulations include without limitation the formulation of lotrafilcon A, lotrafilcon B, etafilcon A, genfilcon A, lenefilcon A, polymacon, acquafilcon A, and balafilcon.

Where a lens-forming fluid material is a solution, it can be prepared by dissolving at least one silicone-containing vinylic monomer or macromer and at least one hydrophilic vinylic monomer and all other desired components in any suitable solvent known to a person skilled in the art. Examples of suitable solvents are alcohols, such as lower alkanols, for example ethanol or methanol, esters such as ethylacetate, butylacetate, and furthermore carboxylic acid amides, such as dimethylformamide, dipolar aprotic solvents, such as dimethyl sulfoxide or methyl ethyl ketone, ketones, for example acetone or cyclohexanone, hydrocarbons, for example toluene, ethers, for example THF, dimethoxyethane or dioxane, and halogenated hydrocarbons, for example trichloroethane, and also mixtures of suitable solvents, for example mixtures of water with an alcohol, for example a water/ethanol or a water/methanol mixture.

In accordance with the present invention, any know suitable silicone-containing macromer can be used to prepare soft contact lenses. A particularly preferred silicone-containing macromer is selected from the group consisting of Macromer A, Macromer B, Macromer C, and Macromer D described in U.S. Pat. No. 5,760,100, herein incorporated by reference in its entirety. Any known suitable silicone-containing vinylic monomers can be used to prepare soft contact lenses. Examples of silicone-containing monomers include, without limitation, methacryloxyalkylsiloxanes, 3-methacryloxy propylpentamethyldisiloxane, bis(methacryloxypropyl) tetramethyl-disiloxane, monomethacrylated polydimethylsiloxane, vinyl terminated polydimethylsiloxane, vinyl terminated polydimethylsiloxane-block-polyethyleneoxide, vinyl terminated polydimethylsiloxane-block-polypropyleneoxide, methacrylate or acrylate terminated polydimethylsiloxane-block-polyethyleneoxide, methacrylate or acrylate terminated polydimethylsiloxane-block-polypropyleneoxide, monoacrylated polydimethylsiloxane, mercapto-terminated polydimethylsiloxane, N-[tris(trimethylsiloxy)silylpropyl]acrylamide, N-[tris(trimethylsiloxy)silylpropyl] methacrylamide, and tristrimethylsilyloxysilylpropyl methacrylate (TRIS). A preferred silicone-containing vinylic monomer is TRIS, which is referred to 3-methacryloxypropyltris(trimethylsiloxy) silane, and represented by CAS No. 17096-07-0. Multi functional monomers and macromers (those containing two or more ethylenically unsaturated units can also serve as cross-linking agents. The term "TRIS" also includes dimers of 3-methacryloxypropyltris(trimethylsiloxy) silane. Monomethacrylated or monoacrylated polydimethylsiloxanes of various molecular weight could be used.

Nearly any hydrophilic vinyl monomer can be used in the fluid composition of the invention. Suitable hydrophilic monomers are, without this being an exhaustive list, hydroxyl-substituted lower alkyl ($C_1$ to $C_8$) acrylates and methacrylates, acrylamide, methacrylamide, (lower allyl) acrylamides and -methacrylamides, ethoxylated acrylates and methacrylates, hydroxyl-substituted (lower alkyl)acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl4,4'-dialkyloxazolin-5-one, 2- and 4-vinylpyridine, vinylically unsaturated carboxylic acids having a total of 3 to 5 carbon atoms, amino(lower alkyl)- (where the term "amino" also includes quaternary ammonium), mono(lower alkylamino)(lower alkyl) and di(lower alkylamino)(lower alkyl)acrylates and methacrylates, allyl alcohol and the like.

Among the preferred hydrophilic vinyl monomers are N,N-dimethylacrylamide (DMA), 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1, 1dimethyl-3-oxobutyl)acrylamide, acrylic acid, and methacrylic acid.

In accordance with the present invention, a polymerizable fluid composition can further comprise various components, such as cross-linking agents, hydrophobic vinylic monomers, initiator, UV-absorbers, inhibitors, fillers, visibility tinting agents, antimicrobial agents, and the like.

Cross-linking agents may be used to improve structural integrity and mechanical strength. Examples of cross-linking agents include without limitation allyl(meth)acrylate, lower alkylene glycol di(meth)acrylate, poly lower alkylene glycol di(meth)acrylate, lower alkylene di(meth)acrylate, divinyl ether, divinyl sulfone, di- or trivinylbenzene, trimethylolpropane tri(meth)acrylate, pentaerythritol tetra(meth)acrylate, bisphenol A di(meth)acrylate, methylenebis(meth)acrylamide, triallyl phthalate or diallyl phthalate. A preferred cross-linking agent is ethylene glycol dimethacrylate (EGDMA).

The amount of a cross-linking agent used is expressed in the weight content with respect to the total polymer and is in the range from 0.05 to 20%, in particular in the range from 0.1 to 10%, and preferably in the range from 0.1 to 2%. If the cross linking agent is a polydimethylsiloxane, or block copolymer of polydimethylsiloxane, the weight percentage in the formulation might be in the range of 30-50% since such a material will be present to enhance oxygen permeability.

Initiators, for example, selected from materials well known for such use in the polymerization art, may be included in the lens-forming fluid material in order to promote, and/or increase the rate of, the polymerization reaction.

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is azobisisobutyronitrile (AIBN).

In accordance with the invention, tubes can be plastic or glass or quartz. The diameter of a tube used in the preparation is larger than the diameter of a contact lens to be made.

In accordance with the invention, a high oxygen permeability in reference to a material or a contact lens characterized by apparent oxygen permeability of at least 40 barrers or larger measured with a sample (film or lens) of 100 microns in thickness according to a coulometric method described in Examples.

In accordance with the invention, the step of curing a lens-forming material to form rods can be carried out actinically (e.g., by UV radiation) or thermally. Preferably, this step is achieved by thermally curing in a multiple stepwise manner (i.e., curing at at least two different temperatures, preferably at at least three different temperatures, more preferably at at least four different temperatures). The lowest curing temperature preferably is from 28° C. to 40° C. and the highest curing temperature is preferably from 80° C. to 120° C. At each curing temperature, the lens-forming material is cured for preferably at least 4 hours. The curing temperature is raised slowly from one to another curing temperature, preferably over about 60 minutes.

Where the step of curing is performed by UV radiation, it is preferably that at first the intensity of UV radiation is maintained at low level and then gradually increases.

Optionally, the rods can be cooled before stripping away the tubes.

The step of post-curing and/or drying is preferably performed at a high temperature, for example, such as, at a temperature of about 75° C. or higher. By having a step of post-curing and/or drying, it is believed that residual unpolymerized monomers and/or macromers in a rod can be further polymerized and that solvent if applicable can be removed. As such, the hardness of the resultant polymer is increased so that the lathability at room temperature of the resultant polymer is achieved. For formulations containing a solvent, a rod preferably is cut into buttons before the step of post-curing and/or drying. With such additional step, the post-curing and in particular drying of the resultant polymer can be facilitate.

The drying of the resultant polymer can be further facilitated by carrying if out at a high temperature and under reduced pressure. Solvent free formulations are preferably post cured in glass tubes.

Post-curing of the resultant polymer can be facilitated by adding a high temperature initiator, which is activated only at elevated temperature (i.e., above curing temperatures in the step of curing to form rods), in the lens-forming fluid material. By adding a high-temperature initiator in the lens-forming fluid material, one may be able to completely polymerize, during the step of post-curing and/or drying, any residual polymerizable components left after curing step, to increase the hardness of the resultant silicone hydrogel material to be lathed. In addition, the high-temperature initiator(s) could also function as to increase cross-link density and hardness during the step of post-curing and/or drying. Examples of suitable high temperature initiators include without limitation VAZO-88 from Dupont, 2,5-bis(ter-butylperoxy)-2,5-dimethylhexane, benzoylperoxide, cumene hydroperoxide, ter-butyl peroxide, ter-butyl hydroperoxide, and ter-butyl peracetate.

Any known suitable lathe apparatus can be used in this invention. Preferably, a computer controllable (or numerically controlled) lathe is used in the invention. More preferably, a numerically controlled two-axis lathe with a 45° piezo cutter or a lathe apparatus disclosed by Durazo and Morgan in U.S. Pat. No. 6,122,999, herein incorporated by reference in its entirety, is used in the invention. Exemplary preferred lathe apparatus include without limitation numerically controlled lathes from Precitech, Inc., for example, such as Optoform ultra-precision lathes (models 30, 40, 50 and 80) having Variform piezo-ceramic fast tool servo attachment.

In a preferred embodiment, lathing process is carried out at a relative humidity of less than about 50%, preferably less than about 40%, more preferably less than about 30%, even more preferably less than about 25%.

In another preferred embodiment, during lathing process, a cold compress air with a temperature lower than about 10° C., preferably lower than 0° C., more preferably less than about −20° C., even more preferably less than about −40° C., is used to blow off debris. By blowing off debris with a cold air, one may have a clean cut.

The present invention, in another aspect, provides a method of making silicone-hydrogel contact lenses by directly lathing a silicone hydrogel material at room temperature. The method of the invention comprises: providing a mold for cast-molding of a polymer button; filling the mold with a lens-forming fluid material capable of forming a polymer or copolymer having high oxygen permeability, wherein the lens-forming material includes at least one silicone-containing vinylic monomer or macromer and at least one hydrophilic vinylic monomer; curing the lens-forming material in the mold to form a polymer in a form of button and having the high oxygen permeability; removing the button from the mold; post-curing and/or drying the button for a time sufficient long to increase the lathability at room temperature of the button; and lathing at room temperature the button into a silicone hydrogel contact lens having an oxygen transmissibility of at least 45 barrers/mm and an ion permeability characterized either by an Ionoton Ion Permeability Coefficient of greater than about $0.2 \times 10^{-6}$ cm$^2$/sec or by an Ionoflux Diffusion Coefficient of greater than about $1.5 \times 10^{-6}$ cm$^2$/min.

A person skilled in the art knows how to make molds for cast-molding polymer buttons. Preferably, a mold can be used to cast mold buttons, the two opposite surfaces of each of which are curved. For example, one of the two opposite surfaces of a button can be a concave curved (e.g., hemispherical) surface whereas the other surface is a convex curved (e.g., hemispherical) surface. Advantage of cast-molding buttons with two opposite curved surfaces is that less silicone hydrogel material is cut away and therefore wasted. The two curved surfaces of a button can have identical or different curvatures. Preferably, the two curved surfaces are spherical.

It should be understood that spin-casting well known to a person skilled in the art can be used to produce a polymer button. In the fabrication of buttons by spin casting, the lens-forming material is placed in the mold cavity having an optical concave surface wetted by said material, and then intermittently and forced fed, one at a time, into the inlet end of a rotating polymerization column which desirably comprises a "conditioning" zone near the inlet end and a polymerization reaction zone toward the outlet end. It is preferred that the molds be characterized by a pretreated optical surface to increase its hydrophylicity or wettability in a manner well-know in the art. The speed of rotation of the tube and the molds, when secured in interference fitting relationship, is adjusted to cause and/or maintain radially outward displacement of the lens-forming material to a predetermined lens configuration which when subjected to the polymerization conditions employed in the tube will form the desired shaped contact lens. Rotational speed of, for example, 300 r.p.m., and lower to 600 r.p.m., and higher, can be conveniently used. The precise rotational speed to employ in the operation is, of course, well within the skill of the artisan. Factors to be considered include the type and concentration of the components comprising the lens-forming material employed, the operative conditions of choice, the type and concentration of initiator, and/or the intensity and type of energy source to initiate polymerization, and factors discussed previously and readily apparent to the artisan.

A person skilled in the art knows well that the polymerization column (tube), as typically used in spin casting, has to be fabricated from a material that will not impede the transmission of the actinic radiation into the polymerization zone of the column. Glass, such as PYREX, would be a suitable material for the polymerization column when using long wavelength U.V. light as actinic radiation. When using other types of actinic radiation as recited above, the polymerization column could be fabricated from various types of metals such as steel, nickel, bronze, various alloys, and the like.

Any lens-forming fluid materials, lathe apparatus, post-curing conditions, drying conditions, and lathing conditions described above can be used in this aspect of the invention.

Curing of a lens-forming material in a mold for making buttons can be carried by actinic radiation or preferably by thermal means.

The present invention, in a further aspect, provides a method of making silicone-hydrogel contact lenses, the method comprising: providing a mold for cast-molding of bonnets, wherein the mold includes a mold half having a molding surface with optical quality, wherein the molding surface defines one of the posterior and anterior surface of a silicone hydrogel contact lens; filling the mold with a lens-forming fluid material capable of forming a polymer or copolymer having high oxygen permeability, wherein the lens-forming material includes at least one silicone-containing vinylic monomer or macromer and at least one hydrophilic vinylic monomer; curing the lens-forming material in the mold to form a polymer in a form of bonnet and having the high oxygen permeability, wherein the bonnet has an optically finished surface corresponding to one of the anterior and posterior surfaces of the contact lens; removing the bonnet from the mold; post-curing and/or drying the bonnet for a time sufficient long to increase the lathability at room temperature of the bonnet; and forming the anterior surface by directly lathing at room temperature of the bonnet on the side opposite to the optically finished surface, thereby obtaining the contact lens, wherein the obtained contact lens has an oxygen transmissibility of at least 45 barrers/mm and an ion permeability characterized either by an Ionoton Ion Permeability Coefficient of greater than about $0.2 \times 10^{-6}$ cm$^2$/sec or by an Ionoflux Diffusion Coefficient of greater than about $1.5 \times 10^{-6}$ cm$^2$/min.

It is believed that when polymerization of a lens-forming material for silicone hydrogel lens in a mold in normal atmosphere could produce a surface which reduces the apparent (measured) ion permeability of the resultant lens. One could enhance ion permeability by lathing both sides of a resultant bonnet to remove a skin (a layer of polymer material detrimental to ion permeability). By removing a skin of a resultant bonnet or a result lens, one can increase the ion permeability while reduce product cost associated with deoxygenating.

Alternatively, ion permeability can be improved by storing bonnet molds in nitrogen or argon prior to use and curing lens formulation in argon or nitrogen. Treatment of molds prior to use is expected to result in higher ion permeability. For example, molds can be stored in a gas chamber containing nitrogen or argon for some period of time before use. This will allow adsorbed oxygen to be removed or partially removed from mold surfaces. The presence of oxygen on mold surfaces is known to cause inhibition of polymerization and skin formation. In addition, one could also cure lens formulations in nitrogen or argon to minimize skin formation on bonnets.

The above described spin-casting can also be used to produce a bonnet having an optically finished surface corresponding to the anterior surface of a contact lens.

Any lens-forming fluid materials, curing methods and conditions, lathe apparatus, post-curing conditions, drying conditions, and lathing conditions described above can be used in this aspect of the invention.

In a preferred embodiment, the first molding surface with optical quality of the first mold half defines the posterior surface of a contact lens to be made. Only one side (the anterior surface) of lens and lens edge need to be lathed from a bonnet.

It is understood that the surface opposite of the optically finished surface of the bonnet can be flat or curved, preferably is a convex hemispherical surface.

The present invention, in still a further aspect, provides a method of making a contact lens, the contact lens having an anterior surface and an opposite posterior surface, the anterior surface having a central optical zone and one or more substantially annular non-optical zones surrounding the central optical zone, the method comprising: providing a mold for cast-molding of bonnets, wherein the mold includes a first mold half having a first molding surface with optical quality and a second mold half having a second molding surface, wherein the second molding surface has a substantially-annular peripheral molding zone with optical quality, wherein the first molding surface defines the posterior surface of the contact lens, wherein the peripheral molding zone defines the one or more non-optical zones on the anterior surface of the contact lens; filling the mold with a lens-forming fluid material; curing the lens-forming fluid material in the mold to form a polymer in a form of bonnet, wherein the bonnet has one optically finished surface corresponding to the posterior surface of the contact lens and one surface having an optically finished zone corresponding to the one or more substantially annular non-optical zones surrounding the central optical zone of the contact lens; removing the bonnet from the mold; post-curing and/or drying the bonnet for a time sufficiently long to increase the lathability at room temperature of the bonnet; and forming the central optical zone and optionally a peripheral blending zone bridging the central optical zone and the non-optical zones by directly lathing at room temperature of surface areas, surrounded by the optically-finished zone on the side opposite to the optically-finished surface, of the bonnet, thereby obtaining the contact lens.

Advantage of this method of the invention is that lathing could be reduced to the finish cuts defining any desired optical zone geometry of the anterior surface of a contact lens while directly molding the entire posterior surface and a target geometry, common to all contact lenses and outside of the optical zone, of the anterior surface of a contact lens. As such, time, cost and material waste associated with the production of customized or made-to-order (MTO) contact lenses can be minimized. Customized or made-to-order (MTO) contact lenses can be made to match exactly to any patient's prescription.

Any lens-forming fluid material can be used in this aspect of the invention. Exemplary preferred lens-forming materials includes without limitation those for forming non-silicone hydrogel materials and for forming silicone hydrogel materials. Preferably, a lens-forming fluid material includes at least one silicone-containing vinylic monomer or macromer and at least one hydrophilic vinylic monomer. More preferably, a lens-forming fluid material is capable of forming a polymer or copolymer having high oxygen permeability and includes at least one silicone-containing vinylic monomer or macromer and at least one hydrophilic vinylic monomer.

In a preferred embodiment of this aspect of the invention, the produced contact lens is a silicone-hydrogel contact lens characterized by having an oxygen transmissibility of at least 45 barrers/mm and an ion permeability characterized either by an Ionoton Ion Permeability Coefficient of greater than about $0.2 \times 10^{-6}$ cm$^2$/sec or by an Ionoflux Diffusion Coefficient of greater than about $1.5 \times 10^{-6}$ cm$^2$/min.

Any lens-forming fluid materials, lathe apparatus, post-curing conditions, drying conditions, and lathing conditions described above can be used in this aspect of the invention.

In a preferred embodiment, the peripheral molding zone defines the one or more non-optical zones on the anterior surface of the contact lens, wherein the one or more non-optical zones comprises orientation stabilization and/or translation features incorporated therein. Any suitable orientation stabilization and translation features can be used. Various orientation stabilization features have been disclosed in the prior art, including without limitation, various prism ballast designs, peri-ballast designs in which the prismatic thickness profile changes are confined in non-optical zone(s) surrounding the optical zone of the lens, a ridge feature which orients the lens by interacting with the eyelid, double slab-off features which have a top slab-off zone and a bottom slab-off zone zones to maintain the lens orientation, dynamic stabilization features disclosed in U.S. published patent application Nos. 2002/0071094 and 2002/0024631. Preferred examples includes orientation stabilization and translation features disclosed in co-pending U.S. patent application Ser. No. 10/848,791 filed May 19, 2004 (herein incorporated by reference in its entirety) and in U.S. Pat. No. 6,467,903 (herein incorporated by reference in its entirety).

The co-pending U.S. patent application Ser. No. 10/848,791 discloses a contact lens which comprises an anterior surface and an opposite posterior surface, wherein the anterior surface includes: a vertical meridian, a horizontal meridian, a central optical zone, a peripheral zone, an edge zone, a first blending zone extending outwardly from the central optical zone to the peripheral zone and providing a continuous transition from the central optical zone to the peripheral zone, a second blending zone extending outwardly from the peripheral zone to the edge zone and providing a continuous transition from the peripheral zone to the edge zone. The anterior surface has a mirror symmetry with respect to a vertical meridian plane and is continuous at least in first derivative. The contact lens is weighed at its lower half portion by varying lens thickness within the peripheral zone and second blending zone to cause it to come to an equilibrium position on the eye and has a lens thickness profile characterized by that lens thickness, in a sector bounded by two sector-bounding semi-meridians at about 35 degrees or larger relative to the lower portion of the vertical meridian and by a portion of the edge included between the two sector-bounding semi-meridians, increases gradually from the inner boundary of the peripheral zone along each semi-meridian until reaching a lens thickness maximum and then decreases.

Preferably, the lens thickness profile is further characterized by that: (1) the lens thickness, along the upper portion of the vertical meridian, of the contact lens in the peripheral zone remains substantially constant or increases gradually from the outer boundary of the peripheral zone to the inner boundary of the peripheral zone in a manner that the difference between the values of lens thickness at two intersection points of the upper portion of the vertical meridian with the outer and inner boundaries of the peripheral zone is less than 50%, preferably by less than 30%, more preferably less than 15%; and/or (2) the lens thickness, along the lower portion of the vertical meridian, of the contact lens in the peripheral zone increases gradually from the inner boundary of the peripheral zone to the outer boundary of the peripheral zone in a manner that the difference between the values of lens thickness at two intersection points of the lower portion of the vertical meridian with the inner and outer boundaries of the peripheral zone is from about 15% to about 65%.

A "vertical meridian", in reference to the anterior surface of a contact lens, refers to an imaginary line running vertically from the top, through the geometric center, to the bottom on the anterior surface, when said lens is maintained at a predetermined orientation on an eye. A "horizontal meridian", in reference to the anterior surface of a contact lens, refers to an imaginary line running horizontally from the left side, through the center, to the right side on the anterior surface, when said lens is maintained at a predetermined orientation on an eye. The horizontal and vertical meridians are perpendicular to each other.

A "outer boundary", in reference to a zone other than a central optical zone on the anterior surface of a contact lens, refers to one of two peripheral boundaries of that zone which is further away from the geometric center of the anterior surface.

An "inner boundary", in reference to a zone other than a central optical zone on the anterior surface of a contact lens, refers to one of two peripheral boundaries of that zone which is closer to the geometric center of the anterior surface.

A "semi-meridian" refers to an imaginary line running radially from the geometric center of the anterior surface of a contact lens to the edge of the contact lens.

The "upper portion of the vertical meridian" refers to one half vertical meridian that is above the geometric center of the anterior surface of a contact lens, when said lens is maintained at a predetermined orientation on an eye.

The "lower portion of the vertical meridian" refers to one half vertical meridian that is below the geometric center of the anterior surface of a contact lens, when said lens is maintained at a predetermined orientation on an eye.

A "continuous transition", in reference to two or more zones, means that these zones are continuous at least in first derivative, preferably in second derivative.

A "vertical meridian plane" refers to a plane that cuts through the optical axis of a contact lens and a vertical meridian on the anterior surface of the contact lens.

A "sector", in reference to the anterior surface of a contact lens, means an area bounded by two sector-bounding semi-meridians at an equal angle relative to the lower portion of the vertical meridian and by a portion of the edge included between the two sector-bounding semi-meridians. The edge included between the two sector-bounding semi-meridians is the sum of a first portion of the edge between one of the two semi-meridians and the lower portion of the vertical meridian and a second portion of the edge between the other semi-meridian and the lower portion of the vertical meridian.

Two "sector-bounding semi-meridians" refer to two semi-meridians which divides the anterior surface into two sectors.

"Lens thickness" refers to a shortest distance from a point on the anterior surface to the posterior surface of a contact lens.

A "percentage of difference between two values of lens thickness" is obtained by first subtracting the smaller value from the larger value and then dividing the subtracting result with the larger value and finally multiplying it with 100.

A "blending zone" refers to a non-optical zone located between two zones and providing a continuous transition between these two zones.

The presence of a first blending zone can allow to separately and independently design the central optical zone and the peripheral zone, so as to ensure a continuous transition from the central optical zone to the peripheral zone. With a first blending zone between the central optical zone and the peripheral zone, a contact lens can be produced to have flexion points and/or sharp boundaries at the junction between two zones being eliminated and thereby provide improved wearer's comfort. In addition, the first blending zone between the central optical zone and the peripheral zone can de-couple the optical features and the mechanical stabilization features of the lens, thus preventing the introduction of prism into the optics. The first blending zone has a surface that ensures that the peripheral zone, the first blending zone and the central optical zone are tangent to each other. The blending zone can be any surface described by a mathematical function, preferably a spline-based mathematical function, or made of different tangent surface patches.

"Tangent surface patches" refer to combinations of surfaces with curvatures that are continuous in first derivative preferably in second derivative, from each other.

The peripheral zone can be composed of one or more peripheral bands or regions which are patched together to form a continuous surface. It is discovered that, when a contact lens has in the peripheral zone and the second blending zone a lens thickness profile as described above, such contact lens can be maintained effectively at a predetermined orientation on an eye. Like a conventional lens ballast, the orientation feature of the invention works by weighing the lens at its lower half portion, causing it to come to an equilibrium position on the eye. With such orientation feature, the optical zone of the anterior surface can be designed independently to provide an optimal visual performance. The peripheral zone can further comprise a ridge feature disposed below the central optical zone and extending outwardly from the peripheral zone to enable engagement with a lower eyelid of a user and thereby provide vertical translation support for the contact lens when being worn by the user. Preferably, the ridge feature is a ramped ridge which includes an upper boundary, a lower ramped boundary, a latitudinal ridge that extends outwardly from the anterior surface, and a ramp that extends downwardly from the lower ramped boundary and has a curvature or slope that provides a varying degree of interaction between the ramped ridge zone and the lower eyelid of an eye depending on where the lower eyelid strikes the ramped ridge zone, as described in published U.S. patent application No. 20040017542 (herein incorporated by reference in its entirety). The ramped ridge preferably has a flattened lower ramp edge and a flattened latitudinal ridge or two bumps formed at the two end of the latitudinal ridge the elevation height of which are higher at the both ends than in the middle.

Lens thickness can also have a value ranging between about 110 to about 150 micrometers in the central 90% of the peripheral zone along the upper portion of the vertical meridian. Actual values will depend on material properties and base curve (posterior surface) parameters. Where the peripheral zone further has a ramped ridge, preferably, the maximum lens thickness of the ridge feature is from about 400 micrometers to about 600 micrometers.

Lens thickness at the intersection point of the lower portion of the vertical meridian with the inner boundary of the central 90% of the peripheral zone is preferably from about 200 micrometers to about 280 micrometers; lens thickness at the intersection point of the lower portion of the vertical meridian with the outer boundary of the central 90% of the peripheral zone is from about 320 micrometers to about 400 micrometers. Actual values will depend on material properties and base curve (posterior surface) parameters.

The size of the sector can be varied. The sector is bound by two sector-bounding semi-meridians preferably at about 90 degrees, more preferably at about 120 degree, even more preferably about 135 degree, relative to the lower portion of the vertical meridian and the edge included between the two sector-bounding semi-meridians. In those preferred embodiments, lens thickness maximums along the horizontal meridian are preferably from about 200 micrometers to about 300 micrometer. Where the sector is bound by two sector-bounding semi-meridians preferably at about 120 degree relative to the lower portion of the vertical meridian and the edge included between the two sector-bounding semi-meridians, lens thickness, in this sector, increases gradually along each semi-meridian until reaching a lens thickness maximum and then decreases whereas in the other remaining sector lens thickness remains substantially constant or increases gradually, along each semi-meridian within this remaining sector, from the outer boundary of the peripheral zone to the inner boundary of the peripheral zone in a manner that the difference between the values of lens thickness at two intersection points of any semi-meridian with the outer and inner boundaries of the peripheral zone is less than 15%.

Lens thickness maximums along semi-meridians are preferably located slightly inside of, alone or slightly outside of the outer boundary of the peripheral zone within the sector. More preferably, lens thickness maximums along semi-meridians are located slightly outside (less than 0.4 mm) of the outer boundary the peripheral zone within the sector.

Distances between the edge of the lens and any points along the outer boundary of the peripheral zone within the sector are preferably from about 0.6 mm to about 2.0 mm.

Preferably, the entire peripheral zone of a contact lens of the invention has a continuity in first derivative and/or in second derivative. Such peripheral zone can be a continuous surface defined by one or more mathematical functions, preferably by a spline-based mathematical function, or is made of several different surface patches.

The second molding surface of a mold used for making a bonnet should be able to mold an optically finished zone corresponding to the substantially annular non-optical zones surrounding the central optical zone of the anterior surface of a contact lens, wherein the non-optical zones having orientation and translation features described above. A person skilled in the art know well how to make molds including molding surfaces that replicate lens surfaces and/or zones when a lens blank (bonnet) is cast in the molds. For example, an optical cutting tool with a numerically controlled lathe may be used to form a metallic optical tool incorporating the features of the non-optical zones of the anterior surface of a contact lens. The tool is then used to make mold halves that are then used, in conjunction with mold halves for molding posterior surface, to form the lens blank using a suitable liquid lens-forming material placed between the mold halves followed by compression and curing of the lens-forming material.

Preferably, optical tools to be used for making the molds are fabricated by using a numerically controlled lathe, for example, such as Optoform® ultra-precision lathes (models 30, 40, 50 and 80) having Variform® or Varimax piezo-ceramic fast tool servo attachment from Precitech, Inc, according to a method described in a co-pending U.S. patent application of CibaVision, entitled "Method for Manufacturing a contact lens", (U.S. Ser. No. 10/616,378, filed on Jul. 9, 2003), published U.S. patent application No. 2004/0017542 and published PCT application No. WO2004011990, herein incorporated by reference in their entireties.

Preferably, a contact lens of the invention has a hydrophilic surface obtained by using a surface modification process. The hydrophilic surface refers to a surface having an averaged contact angle of 85 degrees or less, more preferably 65 degrees or less when the ophthalmic device is fully hydrated. Preferably, the hydrophilic surface is a plasma coating or an LbL coating.

An "average contact angle" refers to a contact angle of water on a surface of a material (measured by Sessile Drop method), which is obtained by averaging measurements of at least 3 individual samples (e.g., contact lenses). Average contact angles (Sessile Drop) of contact lenses can be measured using a VCA 2500 XE contact angle measurement device from AST, Inc., located in Boston, Mass. This equipment is capable of measuring advancing or receding contact angles or sessile (static) contact angles. The measurements are preferably performed on fully hydrated materials.

Contact angle is a general measure of the surface hydrophilicity of a contact lens or an article (e.g., the cavity surface of a container). In particular, a low contact angle corresponds to more hydrophilic surface.

The invention, in other aspects, provides methods for making an intraocular lens, a corneal onlay, stents, glaucoma shunt by directly lathing a silicone hydrogel material at room temperature. The method can comprises various embodiments, preferred embodiments and combinations thereof, which are described above for making silicone-hydrogel contact lenses by directly lathing a silicone hydrogel material at room temperature.

The previous disclosure will enable one having ordinary skill in the art to practice the invention. In order to better enable the reader to understand specific embodiments and the advantages thereof, reference to the following examples is suggested.

Example 1

Unless otherwise stated, all chemicals are used as received. Differential scan calorimetric (DSC) experiments are carried out in aluminum pans in a nitrogen atmosphere using a TA Instruments 2910 DSC. The instrument is calibrated with indium. Glass tubes used for making rods of silicone hydrogel materials are silanized prior to use. Lenses are extracted with isopropanol (isopropyl alcohol) for at least 4 hours and subjected plasma treatment according to procedures described in published U.S. patent application No. 2002/0025389 to obtain plasma coatings. Oxygen and ion permeability measurements are carried out with lenses after extraction and plasma coating. Non-plasma coated lenses are used for tensile testing and water content measurements.

Oxygen Permeability Measurements.

The oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 $cm^3$/min., while a nitrogen stream is passed on the opposite side of the lens at a rate of about 10 to 20 $cm^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where J=oxygen flux [microliters $O_2/cm^2$-minute]
$P_{oxygen} = (P_{measured} - P_{water}$ vapor)=(% $O_2$ in air stream) [mm Hg]=partial pressure of oxygen in the air stream
$P_{measured}$=barometric pressure (mm Hg)
$P_{water}$ vapor=0 mm Hg at 34° C. (in a dry cell) (mm Hg)
$P_{water}$ vapor=40 mm Hg at 34° C. (in a wet cell) (mm Hg)
t=average thickness of the lens over the exposed test area (mm)
where $Dk_{app}$ is expressed in units of barrers.

The oxygen transmissibility (Dk/t) of the material may be calculated by dividing the oxygen permeability ($Dk_{app}$) by the average thickness (t) of the lens.

Ion Permeability Measurements.

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ $mm^2$/minute.

Example 2

Synthesis of Silicone-Containing Macromer 51.5 g (50 mmol) of the perfluoropolyether Fomblin® ZDOL (from Ausimont S.p.A, Milan) having a mean molecular weight of 1030 g/mol and containing 1.96 meq/g of hydroxyl groups according to end-group titration is introduced into a three-neck flask together with 50 mg of dibutyltin dilaurate. The flask contents are evacuated to about 20 mbar with stirring and Subsequently decompressed with argon. This operation is repeated twice. 22.2 g (0.1 mol) of freshly distilled isophorone diisocyanate kept under argon are subsequently added in a counterstream of argon. The temperature in the flask is kept below 30° C. by cooling with a waterbath. After stirring overnight at room temperature, the reaction is complete. Isocyanate titration gives an NCO content of 1.40 meq/g (theory: 1.35 meq/g).

202 g of the α,ω-hydroxypropyl-terminated polydimethylsiloxane KF-6001 from Shin-Etsu having a mean molecular weight of 2000 g/mol (1.00 meq/g of hydroxyl groups according to titration) are introduced into a flask. The flask contents are evacuated to approx. 0.1 mbar and decompressed with argon. This operation is repeated twice. The degassed siloxane is dissolved in 202 ml of freshly distilled toluene kept under argon, and 100 mg of dibutyltin dilaurate (DBTDL) are added. After complete homogenization of the solution, all the perfluoropolyether reacted with isophorone diisocyanate (IPDI) is added under argon. After stirring overnight at room temperature, the reaction is complete. The solvent is stripped off under a high vacuum at room temperature. Microtitration shows 0.36 meq/g of hydroxyl groups (theory 0.37 meq/g).

13.78 g (88.9 mmol) of 2-isocyanatoethyl methacrylate (IEM) are added under argon to 247 g of the α,σ-hydroxypropyl-terminated polysiloxane-perfluoropolyether-polysiloxane three-block copolymer (a three-block copolymer on stoichiometric average, but other block lengths are also present). The mixture is stirred at room temperature for three days. Microtitration then no longer shows any isocyanate groups (detection limit 0.01 meq/g). 0.34 meq/g of methacryl groups are found (theory 0.34 meq/g).

The macromer prepared in this way is completely colourless and clear. It can be stored in air at room temperature for several months in the absence of light without any change in molecular weight.

Control Formulations

The above prepared siloxane-containing macromer is use in preparation of two formulations used in the control experiments. Each components and its concentration (percentage by weight) are listed in the Table 1.

TABLE 1

| Formulation | Macromer | TRIS | DMA | Darocure ® 1173 | Ethanol |
|---|---|---|---|---|---|
| I | 37.4 | 15.0 | 22.5 | 0.3 | 24.8 |
| II* | 25.9 | 19.2 | 28.9 | 1 | 25 |

*Formulation II contains about 50 ppm of copper phthalocyanin.

Example 3

Lens-Forming Material Preparation (1563-37-1). To 127.27 grams of a mixture consisting of 25.85% by weight of macromer prepared in Example 2, 28.80% by weight of DMA, 19.20% by weight of TRIS, 24.88% by weight of ethanol, 1.00 by weight of Daracure 1173) is added 0.3435 grams of VAZO-52 to prepare a lens-forming material.

(1563-37-2). A mixture consisting of 88.25 grams of macromer prepared in Example 2, 35.28 grams of TRIS, 52.96 grams of DMA, 0.7038 grams of VAZO-52 and 58.59 grams of absolute ethanol were mixed until homogenous.

(DMA=N,N-dimethyl acrylamide, TRIS=3-methacryloxypropyl-tris(trimethylsiloxane), Daracure 1173=2-hydroxy-2-methyl-phenyl-1-one, VAZO-52=2,2'-azo-bis(2,4-dimethylvaleronitrile)

Polymer Rod Preparation

Silanized glass vials (40 dram) are filled with a lens-forming material (1563-37-1 or 1563-37-2) sparged with nitrogen for about 2 minutes, sealed and centrifuged for 5 minutes at 4000 RPM. Samples are then cured in a forced air oven as follows: 30° C./24 hours, 50° C./24 hours, 75° C./24 hours, 100° C./4 hours (Note: Due to the presence of solvent, significant expansion of polymer occurs during the 100° C. heating stage. As a result, sample is cooled and the glass is stripped from the sample.) Polymer rod is removed from glass tubes and cured/dried at 130° C./24 hours. Disks are cut from the rod and further dried at 75° C./24 hours (note: Except from room temp to 30° C., 60 minute ramps are used to reach each plateau temperature).

Glass transition temperatures of a polymer cut from a dried disk is determined according to DSC measurements at a scan rate of 20° C./minute. An endothermic peak characteristics of melting occurs at around 18° C. in all testing samples. The results are reported in Table 2.

As one might expect, material prepared from formulation 1563-37-1 has a higher glass transition temperature ($T_g$) and better lathing characteristics than the prepared from formulation 1563-37-2. The higher $T_g$ and better lathing properties of 1563-37-1 as compared to 1563-37-2 is attributed to lower silicone-containing macromer content in 1563-37-1.

TABLE 2

| Sample | Ion Permeability | Dk (Barrer) | $T_g$ (° C.) |
|---|---|---|---|
| 1563-37-1 | 14.2 ± 0.43 | 72.7 ± 3.49 | 43 |
| 1563-37-2 | 4.9 ± 0.13 | 94.3 ± 4.2 | 32 |
| Formulation I* | ~1–5 | ~100 | N/A |
| Formulation II* | ~4–6 | ~70 | N/A |

*Control experiments. Formulation I or II is cured in polypropylene molds for molding Focus NIGHT & DAY ™ lenses.

Lens Preparation

Button Generation Process:

Polymerized Silicone Hydrogel rods are removed from the glass tubes. After separating the polymer rods from the glass tubes, rods are grinded using a center less grinding machine plus it's grinding oil, in order to remove any superficial rod deformity due to its polymerization process and to assure the same rod diameter time after time.

Button Trimming Process:

Grinded polymer rods are converted into buttons using button trimming lathes. Each Silicone Hydrogel rod is loaded into the button trimming lathe collet mechanism and four (4) forming carbide tools form the button shape while the spindle rotates at 3000 revolutions per minutes. Silicone Hydrogel buttons are then packed into aluminum bags to avoid any pre-hydration. Button trimming process takes place in an environment condition of 20%±5% relative humidity (Rh) at about 72° F.

Mini File Generation:

The geometry to achieve the lens design is described in a file called mini file. The mini file (.MNI) is a geometric description of the profile to be generated that allows complex geometries to be described with comparatively small files and the time to process these files is relatively small when compared with job files (.JFL). Mini files for silicone Hydrogel are created using Mini File Engine software package. The mini files describe any surface in a reasonable number of zones and is unique for each order.

Lens Lathing:

Once the polymer button and mini files have been generated, OPTOFORM lathes (any one of Optoform 40, Optoform 50, and Optoform 80 with or without the Variform or Varimax third axis attachment) plus their off axis conic generators are used to perform the concave or convex lens lathing. Lathing step take place in an environment of 20%±2% Rh with a temperature of 72±2° F. During lathing natural or synthetic control waviness diamond tools are used. Machining speed of lens lathing goes form 2500-10,000 RPM with feed rates that ranges form 10-30 mm/min. During lathing process, a compress air at a dew point of about –60° F. is used for blow off debris for a clean cut. Finished parts are inspected for compliance.

Lenses are packaged in a phosphate buffered saline. Lenses are extracted with isopropanol, dried, plasma coated and then rehydrated.

Oxygen permeability of plasma coated lenses are determined according to the method disclosed by Nicolson et al. (U.S. Pat. No. 5,760,100) (herein incorporated by reference in its entirety). Four lenses are tested and averaged oxygen permeability is reported in Table 2. Oxygen permeability and ion permeability of plasma coated lenses are determined according to the method disclosed by Nicolson et al. (U.S. Pat. No. 5,760,100) (herein incorporated by reference in its entirety) and reported in Table 2. Oxygen permeability of the plasma coated lenses are comparable with those of controls (Formulation I and Formulation II). Ion permeability (IP) of 1563-37-2 is in an expected range while that of 1563-37-2 is exceptionally high.

Example 4

DMA, macromer prepared in Example 2, TRIS, a styrenic monomer (e.g., styrene or t-butyl styrene) and VAZO-52 are mixed to prepare solvent free formulations shown in Table 3 for making room temperature lathable silicone hydrogel materials. Styrene or t-butyl styrene is added in a formulation to ensure miscibility of all components in the absence of solvent (e.g., ethanol) and to enhance lathing characteristics (raise $T_g$) of the polymer.

TABLE 3

| | Formulation (% by weight) | | |
|---|---|---|---|
| Component | 1563-61-1 | 1563-91-1 | 1563-91-2 |
| DMA | 30.04 | 33.78 | 33.78 |
| Macromer* | 36.05 | 37.98 | 37.98 |
| TRIS | 21.62 | 17.99 | 17.99 |
| Styrene | 12.04 | 9.99 | 0.00 |
| t-butyl styrene | 0.00 | 0.00 | 9.99 |
| VAZO-52 | 0.24 | 0.25 | 0.25 |
| Daracure 1173 | 0.00 | 0.00 | 0.00 |
| Irgacure 2959 | 0.00 | 0.00 | 0.00 |

*Prepared in Example 2.

Example 5

Preparation of Rods of Lathable Silicone Hydrogels

A formulation prepared in Example 4 is sparged with nitrogen and then poured into silanized glass test tubes (about 75 ml of the formulation). Each tube is capped with rubber septa and then underwent degassing cycles as follows. Vacuum is applied to each tube filled with the formulation for several minutes and then pressure is equalized with nitrogen. Such degassing pressure equalization operation is repeated three times.

The formulation 1563-61-1 is thermally cured and post cured according to the following schedule: (a) at 30° C. for 42 hours in an oil bath; (b) at 50° C. for 13 hours in a force air oven; (c) at 75° C. for 20 hours in a force air oven; and (d) at 105° C. for 8 hours in a force air oven. 60 minute ramp rates are used in the cure oven to reach each cure temperature. Samples are allowed to slowly cool to room temperature.

The formulation 1563-91-1 or 1563-91-2 is thermally cured and post cured according to the following schedule: (a) at 30° C. for 48 hours in an oil bath; (b) at 40° C. for 18 hours in an oil bath; (c) at 50° C. for 12 hours in a force air oven; (d) at 75° C. for 12 hours in a force air oven; and (e) at 105° C. for 30 hours in a force air oven. 60 minute ramp rates are used in the cure oven to reach each cure temperature. A 4 hour cool down ramp is used to cool samples from 105° C. to 30° C. at the end of curing.

Polymer cut from cured rod is tested for glass transition temperature ($T_g$) according to DSC analysis at a scan rate of 20° C./minute. Results are reported in Table 4 of 68° C. The DSC thermogram for sample 1563-61-1 also shows small endothermic peaks near 9° C. and 25° C. The nature of the endothermic peaks is not known at this time.

TABLE 4

| | Polymer obtained from Formulation of | | |
|---|---|---|---|
| | 1563-61-1 | 1563-91-1 | 1563-91-2 |
| $T_g$ (° C.) | 68 | 68 | 60 |

Extraction and Analysis of Polymer Rods

Polymer rods from samples 1563-91-1 and 1563-91-2 are ground on a lathe. Obtained shavings are extracted in isopropanol for 4 and 24 hours. There are no detectable quantities of monomer (DMA, TRIS, styrene or t-butyl styrene) as measured by gas chromatography (GC) after 4 and 24 hours of extraction. The limits of detection are about 100 parts per million (ppm). Extracts are also analyzed by GPC and only a trace quantity of polymeric material with a retention time in the range of silicone-containing macromer (Example 2) is detected in sample 1563-91-1 (24 hour extract). GPC traces from silicone-containing macromer (Example 2) shows a main peak with a shoulder. The shoulder observed in the GPC trace of silicone-containing macromer (Example 2) is not observed in the peak from extract of 1563-91-1. However, the signal in the GPC trace is very weak and poorly defined.

Example 6

Lens Preparation

Button Generation Process:

Polymerized Silicone Hydrogel rods, which are prepared according to procedures described in Example 5, are removed from the glass tubes. After separating the polymer rods from the glass tubes, rods are grinded using a center less grinding machine plus it's grinding oil, in order to remove any superficial rod deformity due to its polymerization process and to assure the same rod diameter time after time.

Button Trimming Process:

Grinded polymer rods are converted into buttons using button trimming lathes. Each Silicone Hydrogel rod is loaded into the button trimming lathe collet mechanism and four (4) forming carbide tools form the button shape while the spindle rotates at 3000 revolutions per minutes. Silicone Hydrogel buttons are then packed into aluminum bags to avoid any pre-hydration. Button trimming process takes place in an environment condition of 20%±5% relative humidity (Rh) at about 72° F.

Mini File Generation:

The geometry to achieve the lens design is described in a file called mini file. The mini file (.MNI) is a geometric description of the profile to be generated that allows complex geometries to be described with comparatively small files and the time to process these files is relatively small when compared with job files (.JFL). Mini files for silicone Hydrogel are created using Mini File Engine software package. The mini files describe any surface in a reasonable number of zones and is unique for each order.

Lens Lathing:

Once the polymer button and mini files have been generated, OPTOFORM lathes (any one of Optoform 40, Optoform 50, and Optoform 80 with or without the Variform or Varimax third axis attachment) plus their off axis conic generators are used to perform the concave or convex lens lathing. Lathing step take place in an environment of 20%±2% Rh with a temperature of 72±2° F. During lathing natural or synthetic control waviness diamond tools are used. Machining speed of lens lathing goes form 2500-10,000 RPM with feed rates that ranges form 10-30 mm/min. During lathing process, a compress air at a dew point of about −60° F. is used for blow off debris for a clean cut. Finished parts are inspected for compliance.

Lenses are packaged in a phosphate buffered saline and sterilized (at 123° C. for 20 minutes). Non-plasma coated and sterilized lenses are tested for mechanical properties and water content of lenses. Results are given in table 5. Tensile properties, water content and contact angle measurements are performed on non-plasma coated lenses. For tensile testing, strain rate of 12 mm/min, gauge length of 6.5 mm, strips (2.90 mm width, and 0.096 mm thickness) are used. All samples are submerged in a saline bath during tensile testing. Lenses are autoclaved prior to testing.

The non-plasma coated lenses (1563-61-1) has hydrophobic surfaces as evidenced by an advancing contact angle of 108° (receding contact angle of 56°.

Lenses are extracted with isopropanol for about 4 hours and with water for about 2 hours, dried, plasma coated and then rehydrated prior to oxygen and ion permeability measurements. Oxygen permeability and ion permeability of plasma coated lenses are determined according to the method disclosed by Nicolson et al. (U.S. Pat. No. 5,760,100) (herein incorporated by reference in its entirety). A plurality of lenses are tested and averaged oxygen and ion permeabilities are reported in Table 5.

TABLE 5

| Properties | Lenses prepared from formulation | | | | |
|---|---|---|---|---|---|
| | 1563-61-1 | 1563-91-1 | 1563-91-2 | I | II |
| Non-plasma-coated lenses | | | | | |
| Water content[1] | 27% | 32% | 31% | 23.3% | |
| Modulus (N/mm$^2$) | 1.04 ± 0.22 | 1.10 ± 0.06 | 1.28 ± 0.28 | 1.40 ± 0.07 | |
| Elongation at Break (%) | 405 ± 61 | 325 ± 92 | 334 ± 51 | 170 ± 46 | |
| Max Elongation (%) | 480 | 440 | 404 | 232 | |
| Break stress (N/mm$^2$) | 5.45 ± 1.53 | 4.16 ± 2.05 | 5.27 ± 1.62 | 1.56 ± 0.46 | |
| Plasma-coated lenses | | | | | |
| Dk (Barrer) | 61.0 ± 2.7 | 73.9 ± 2.8 | 78.4 ± 3.5 | 100 | 70 |
| Ion Permeability | 0.90 ± 0.18 | 3.21 ± 0.12 | 2.94 ± 0.05 | 1–5 | 4–6 |

The lenses lathed from all samples have ion permeability (IP) and oxygen permeability (Dk) comparable with control lenses (Formulation I or II).

Lenses lathed from all samples show excellent mechanical properties. Young's modulus is lower than that of control (Formulation I). The lenses are extremely strong as evidenced by a break stress value of from about 4.16 to about 5.45 N/mm$^2$ as compared to 1.56 N/mm$^2$ for control (Formulation I). Lenses are also more elastic (elongation at break of from about 325 to about 405%) as compared to about 170% for control lenses (Formulation I).

The greater mechanical strength and elasticity of the lathed lenses as compared to control lenses (Formulation I) is believed to be largely due to differences in method of polymerization and formulation. Each of formulations for the lathed lenses has about 0.25% by weight of initiator and does not contain solvent (e.g. ethanol in Formulation I as control). In addition, the formulations developed for lathing are cured at relatively low temperature. Curing temperature is not raised above 30° C. until the polymer is gelled. All of theses factors may promote high molecular weight and high conversion of monomer prior to the point of gelation. Polymer with high molecular weight and monomer conversion prior to the point of gelation is expected to yield material with good mechanical properties. In contrast, in control experiments, both formulation I and II utilize solvent and high levels of photo initiator. High initiator concentration and the use of solvent will result in low molecular weight prior to the point of gelation.

Lenses from formulation 1563-91-2 containing t-butyl styrene has a slightly higher Dk (78 barrers) than those from formulation 1563-91-1 (Dk=74 barrers). Although both the formulation 1563-91-1 and formulation 1563-91-2 contain 10% by weight of styrenic monomer (styrene or t-butyl styrene), on a molar basis formulation 1563-91-2 contains 1.5 times less styrenic monomer than formulation 1563-91-1 does. It is believed that the bulkiness of the t-butyl moieties may be able to enhance oxygen permeability of lenses.

Extraction and Analysis of Lenses from 1563-91-1 and 1563-91-2

The plasma coated lenses are subjected to extraction and extractable analysis The extracts are analyzed by GPC. Extremely low levels of polymer/macromer have been found as compared to control lenses (Formulation II). These results are summarized in table 4. Peak areas from experimental lens extracts were indexed to peak areas of Everest control groups. The level of extractables in the lathed lenses is from about 34 to about 44 times less than the control lenses (Formulation II).

Differences in method of curing and formulations are likely causes for the differences in extractables as discussed above. Polymer from the lathed lenses is thermally cured at relatively low temperature with low initiator concentration and in the absence of solvent. All of theses factors promote high molecular weight and conversion of monomer prior to the point of gelation. All of these factors also favor lower levels of extractable material. Control lenses (Formulation II) are UV-cured in ethanol at relatively high initiator concentration. The presence of ethanol and high initiator concentration in control are likely to contribute to higher levels of extractables as compared to the lathed lenses. The polymeric extract observed by GPC is believed to be a copolymer of DMA and TRIS.

Example 7

Production of Contact Lenses From Bonnets

A. A silicone hydrogel lens formulation is prepared by mixing DMA (33.8112 g), macromer prepared in Example 2 (37.9989 g), TRIS (18.1648 g), t-butyl styrene (10.0159 g) and VAZO-52 (0.2535 g). The prepared formulation is used to prepare bonnets as follows. A plastic cap is filled with about 0.75 mL of the lens formulation and then a polypropylene lens base curve mold half (FreshLook mold) is placed in the lens formulation. The lens formulation is cured in a forced air oven according to the following cure schedule: 75° C./2 hours (10 min ramp from 45° C. set point), 110° C./16 hours (10 minute ramp from 75° C.). Lens blanks (bonnets) with base curve (posterior) surface is lathed directly with a lath at room temperature into contact lenses as described in the previous examples. The anterior surface (front curve) of each contact lens is lathed since its base curve is directly molded. After lathing lens front curves, lenses are extracted, dried, plasma coated as described in Example 1, and then hydrated. Ion permeability (relative ionoflux diffusion coefficient, D/D$_{ref}$, in reference to Alsacon) is 0.05. Oxygen permeability is 68 barrers. The low ion permeability value is believed to be due to a skin effect that can be eliminated by removing a layer of polymer from the base curve of the silicone hydrogel.

B. A silicone hydrogel lens formulation (1575-36-1) is prepared by mixing DMA (33.8706 g), prepared in Example 2 (37.9962 g), TRIS (18.1604 g), t-butylstyrene (10.0513 g) and VAZO-52 (0.2551 g). The prepared formulation is used to prepare bonnets as follows. A plastic cap is filled with about 0.75 mL of the lens formulation, a polypropylene base curve mold half (FreshLook type, polypropylene) is placed in the lens formulation. The assemblies (each composed of a cup and a base curve mold half) with the lens formulation are leveled by placing the assemblies between two plastic plates and then placing a 5 pound lead donut on the upper plate. Lens formulation is cured at 75° C. for 2 hours in a forced air oven. The assemblies are opened and the resultant bonnets resting on polypropylene base curve molds are cured for an additional 16 hours at 110° C. in a forced air oven. Lenses are produced by lathing at room temperature the front curve of each bonnet as well as by removing a layer (or skin) of about 0.5 mm of material from the base curve surface of each bonnet. Lenses are extracted, plasma coated and sterilized. Lens Ion permeability (relative ionoflux diffusion coefficient, $D/D_{ref}$, in reference to Alsacon) is 2.92 while oxygen permeability is 65 barrers.

Removal of material from both front and back curve surfaces of bonnets ensures that skin effects are eliminated. Skin effects are believed to be the result of surface inhibition during polymerization. Adsorbed oxygen on mold surfaces can result in surface inhibition of polymerization and cause a skin to form. One can eliminate or minimize skin effects by storing plastic molds under nitrogen or argon prior to use.

C. A silicone hydrogel lens formulation is prepared by combining macromer prepared in Example 2 (190.12 g), TRIS (90.09 g), DMA (169.08 g), styrene (50.02 g) and VAZO-52 (1.2261 g). The prepared formulation is used to prepare bonnets as follows. A plastic cup is filled with about 0.6 mL of lens formulation and then zeonex base curve mold half (BOO1 type of mold design) is then placed in the lens formulation. The assembly (each composed of a cup and a base curve mold half) with the lens formulation is placed in a forced air oven and the lens formulation is cured for 2 hours at 75° C. The assemblies are separated and bonnet polymer is further cured (still on BOO1 mold) at 110° C. for 16 hours. DSC analysis of silicone hydrogel polymer cut from the bonnet is analyzed by DSC (20° C./min) and has a glass transition temperature of about 64° C. ($2^{nd}$ scan). Shore-A hardness of the sample is >100 (off scale). Samples are lathable but it is not possible to de-block the lens from the mold. Lens formulations penetrate the molds and after curing lens banks are bonded to molds.

D. A silicone hydrogel lens formulation is prepared by combining macromer prepared in Example 2 (190.15 g), TRIS (90.05 g), DMA (169.23 g), t-butylstyrene (50.01 g) and VAZO-52 (1.2234 g). The prepared formulation is used to prepare bonnets as follows. A plastic cup is filled with about 0.6 mL of lens formulation and then a zeonex base curve mold half (BOO1 type of mold design) is then placed in the lens formulation. The assembly (each composed of a cup and a base curve mold half) with the lens formulation is placed in a forced air oven and the lens formulation is cured for 2 hours at 75° C. The assemblies are separated and bonnet polymer is further cured (still on BOO1 mold) at 110° C. for 16 hours. DSC analysis of silicone hydrogel polymer cut from the bonnet is analyzed by DSC (20 C/min) and has a glass transition temperature of about 59° C. ($2^{nd}$ scan). Shore-A hardness of the sample is >100 (off scale). Samples are lathable but it is not possible to de-block the lens from the mold. Lens formulations penetrate the molds and after curing lens banks are bonded to molds.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. A method for making silicone-hydrogel contact lenses, comprising:
   a) obtaining a solvent-free lens-forming fluid material capable of forming a polymer or copolymer having high oxygen permeability, wherein the lens-forming material includes at least one silicone-containing vinylic monomer, at least one silicone-containing vinylic macromer, at least one hydrophilic vinylic monomer, and one styrenic monomer;
   b) filling one or more tubes with the lens-forming material;
   c) slowly curing the lens-forming material in the tubes to form a polymer in a form of rod and having the high oxygen permeability;
   d) stripping away the tubes from the polymer;
   e) post-curing and/or drying the polymer for a time sufficiently long to increase the lathability at room temperature of the polymer; and
   f) lathing at room temperature the polymer into the contact lenses, wherein each contact lens has an oxygen transmissibility of at least 45 barrers/mm and an ion permeability characterized either by an Ionoton Ion Permeability Coefficient of greater than about $0.2 \times 10^{-6}$ cm$^2$/sec or by an Ionoflux Diffusion Coefficient of greater than about $1.5 \times 10^{-6}$ cm$^2$/min, wherein the step c) is performed by thermally curing the lens-forming material in the tubes in a multiple stepwise curing process comprising at least a first thermal curing step at a first curing temperature of from about 28° C. to about 40° C. and a second thermal curing step at a second curing temperature of from about 80° C. to about 120° C.

2. The method of claim 1, wherein the multiple stepwise curing process further comprises between the first and second step an additional step at a curing temperature between the first and second curing temperatures.

3. The method of claim 2, wherein curing temperature is raised slowly from one to another over about 60 minutes.

4. The method of claim 1, wherein the step c) is performed by UV radiation in a procedure in which at first the intensity of UV radiation is maintained at low level and then gradually increases.

5. The method of claim 1, wherein the step e) is performed at a temperature of about 75° C. or higher.

6. The method of claim 5, wherein the lens-forming fluid material includes a high-temperature initiator which is activated only at an elevated temperature above curing temperatures in the step c).

7. The method of claim 1, wherein the rod produced in the step c) is cut into buttons before the step e).

* * * * *